(12) United States Patent
Lu

(10) Patent No.: US 12,653,155 B1
(45) Date of Patent: Jun. 16, 2026

(54) PET TOY

(71) Applicant: NINGBO SINCERE LEISURE PRODUCTS CO., LTD., Ningbo (CN)

(72) Inventor: Charley Lu, Ningbo (CN)

(73) Assignee: NINGBO SINCERE LEISURE PRODUCTS CO., LTD., Ningbo (CN)

( * ) Notice: Subject to any disclaimer, the term of this patent is extended or adjusted under 35 U.S.C. 154(b) by 0 days.

(21) Appl. No.: 19/190,546

(22) Filed: Apr. 25, 2025

(30) Foreign Application Priority Data

Mar. 5, 2025 (CN) .......................... 202510259966.5

(51) Int. Cl.
A01K 15/02 (2006.01)
(52) U.S. Cl.
CPC ................................ A01K 15/0257 (2025.08)
(58) Field of Classification Search
CPC .. A01K 15/025; A01K 15/0257; A63H 13/00; A63H 13/02; A63H 13/20
See application file for complete search history.

(56) References Cited

U.S. PATENT DOCUMENTS

| | | | | |
|---|---|---|---|---|
| 4,803,953 | A * | 2/1989 | Graves ................. | A01K 15/025 |
| | | | | 124/16 |
| 6,591,785 | B1 * | 7/2003 | Boshears ............. | A01K 15/025 |
| | | | | 119/706 |
| 10,477,837 | B1 * | 11/2019 | Liu ...................... | A01K 15/025 |
| 10,869,461 | B1 * | 12/2020 | Kreischer ............ | A01K 15/025 |
| 11,260,313 | B2 * | 3/2022 | Gamble ................ | A63H 29/22 |
| 12,349,656 | B1 * | 7/2025 | Liu ...................... | A01K 15/025 |
| 2012/0234258 | A1 * | 9/2012 | Cook ................... | A01K 15/025 |
| | | | | 119/708 |

FOREIGN PATENT DOCUMENTS

CN       210226537 U   *   4/2020

* cited by examiner

*Primary Examiner* — Magdalena Topolski
*Assistant Examiner* — Katherine Anne Kloecker
(74) *Attorney, Agent, or Firm* — Che-Yang Chen

(57) ABSTRACT

This application provides a pet toy, comprising: a toy member; a toy housing configured with multiple openings, with the openings distributed at different positions along a preset direction; and a drive structure including a first drive assembly, a second drive assembly, and a connecting member. The connecting member is connected to the toy member, with one end attached to the first drive assembly and the other end attached to the second drive assembly, allowing the toy member to sequentially move through adjacent and/or spaced openings when driven by the first drive assembly and/or second drive assembly. The first drive assembly and second drive assembly apply minimal tension to the connecting member, enabling quick adjustments even when the connecting member is in a loose state. Additionally, the design allows pets to pull or bite the toy member during play without compromising its functionality, ensuring it quickly returns to normal operation.

15 Claims, 5 Drawing Sheets

PET TOY

CROSS-REFERENCE TO RELATED APPLICATIONS

This application claims priority to Chinese Patent Application No. 202510259966.5, filed on Mar. 5, 2025, the content of which is incorporated herein by reference in its entirety.

TECHNICAL FIELD

The present application relates to the field of pet products, and specifically to a pet toy.

BACKGROUND

As people's living standards continue to improve, keeping pets at home is no longer just about raising dogs for guarding the house or cats for catching mice, as in the past. Instead, pets are now considered companions that stay by people's sides. Many people even regard their pets as family members, which has led to increased attention and care for them.

Currently, the market lacks a sufficient variety of pet toys, and in many cases, children's toys are simply repurposed and sold as pet toys. Therefore, there is an urgent need for a dedicated pet toy to fulfill the purpose of pet entertainment and play.

SUMMARY

The purpose of this application is to provide a throwing a pet toy that can fulfill the purpose of pet play.

This application provides an embodiment of a pet toy, which comprises: a toy housing configured with multiple openings, wherein the multiple openings are distributed at different positions along a preset direction; a drive structure including a first drive assembly, a second drive assembly, and a connecting member for driving at least one toy member for playing with or training a pet, wherein one end of the connecting member is connected to the first drive assembly, while the other end is connected to the second drive assembly, so that when the first drive assembly and/or second drive assembly operates, the toy member sequentially passes through adjacent and/or spaced of the multiple openings.

In the above implementing process, the toy member is connected to the connecting member, while the first drive assembly and second drive assembly are respectively connected to the connecting member. The tension applied to the connecting member by the first drive assembly and second drive assembly is not high, allowing for quick adjustments even when the connecting member is in a relaxed state. Moreover, pets are able to pull or bite the toy member during play without affecting its functionality, as the toy can quickly return to normal operation. This allows the first drive assembly and/or second drive assembly to move the toy member through multiple openings, achieving an excellent pet-enticing effect.

In some embodiments, the first drive assembly comprises a first drive component and a first rotating wheel component. The first drive component is connected to the first rotating wheel component, which is configured to wind or release the connecting member. The first rotating wheel component is driven by the drive end of the first drive component or rotates relative to the drive end of the first drive component.

In the above implementing process, the first drive component is connected to the first rotating wheel component. The first rotating wheel component can either be directly driven by the first drive component to move the toy member or, when the toy member experiences external force, it can rotate relative to the first drive component under the tension of the connecting member. This design can attract pets for play and exercise while preventing injuries. Furthermore, when the pet releases the toy, the pet toy can gradually return to normal operation without losing functionality.

In some embodiments, the second drive assembly comprises a second drive component and a second rotating wheel component. The second drive component is connected to the second rotating wheel component, which is configured to wind or release the connecting member. The second rotating wheel component is driven by the drive end of the second drive component or rotates relative to the drive end of the second drive component.

In the above implementing process, the second drive component is connected to the second rotating wheel component. The second rotating wheel component can either be directly driven by the second drive component to move the toy member or, when the toy member experiences external force, it can rotate relative to the second drive component under the tension of the connecting member. This design attracts pets to play and exercise while preventing injuries. Additionally, when the pet releases the toy, the pet toy can gradually return to normal operation without losing functionality.

In some embodiments, both of the first drive assembly and second drive assembly each comprise a retraction state and a release state, wherein the first drive assembly is in the retraction state and the second drive assembly is in the release state, and after the first drive assembly completes the retraction of the connecting member, the first drive assembly reverses for a preset time, and then the first drive assembly switches to the release state while the second drive assembly switches to the retraction state. When the first drive assembly is in the release state and the second drive assembly is in the retraction state, and after the second drive assembly completes the retraction of the connecting member, it reverses for a preset time, and then the second drive assembly switches to the release state while the first drive assembly switches to the retraction state.

In the above implementing process, both the first drive assembly and second drive assembly can switch between retraction and release states. This enables the toy member to move between the first drive assembly and second drive assembly, effectively preventing the connecting member from tangling due to tension, ensuring the durability of the pet toy, preventing injuries to pets, and enhancing safety.

In some embodiments, before and/or after the first drive assembly and/or second drive assembly completes the retraction of the connecting member, at least one of them is controlled to rotate in the loose direction for a preset short time before entering the next cycle of retraction and release of the connecting member. This effectively saves power while solving potential jamming issues.

In some embodiments, one of the first drive assembly and second drive assembly is actively driven, while the other is passively driven.

In the above implementing process, after one drive cycle is completed, the rope is wound onto one of the rotating wheels, leaving the other wheel almost empty. This prevents friction from occurring on both wheels simultaneously during the next drive switch. By ensuring winding occurs on only one side, friction is reduced, making the drive easier and preventing jamming that could cause failure, thereby improving the product's durability and playability.

In some embodiments, the length of the connecting member is 1.5 to 3 times the length of the toy housing. This design prevents excessive friction build-up when the connecting member is wound, thereby avoiding jamming and ensuring that the torque required for reversing the first drive assembly or second drive assembly is sufficient to overcome the friction. As a result, it prevents drive failure and ensures the smooth movement of the toy member, enhancing durability and playability.

In some embodiments, the toy housing comprises a first housing component, second housing component, and a third housing component. The first housing component is configured to accommodate the first drive assembly, the second housing component are positioned between the first housing component and third housing component and contain multiple openings, and the third housing component is configured to accommodate the second drive assembly.

In the above implementing process, the first drive assembly and second drive assembly are placed inside the toy housing, ensuring both aesthetic appeal and protection for the components, thereby increasing their lifespan. The second housing component feature multiple openings, through which the connecting member moves along a predetermined path. This allows the toy member to travel along a preset route during operation of the first drive assembly or second drive assembly, creating a "hide-and-seek" game that attracts pets and enhances their play experience.

In some embodiments, the toy housing further comprises a first support component and a second support component, where the first support component is connected to the first housing component, and the second support component is connected to the third housing component.

In the above implementing process, the first support component is positioned on the first housing component, and the second support component is positioned on the third housing component. These support components help stabilize the pet toy, making it easier for users to secure it.

In some embodiments, the drive structure further comprises a switch member, a control board, and a battery. The switch member is connected to the control board, the control board is connected to the first drive assembly and second drive assembly, and the battery powers both drive assembly.

In the above implementing process, the switch member controls the operation of the first drive assembly and/or second drive assembly through the control board. The tension applied to the connecting member remains low, allowing for quick adjustments even when loosened. Additionally, pets can pull or bite the toy member without compromising its functionality, as it can quickly return to normal operation without requiring disassembly or repair. This also simplifies product assembly. Furthermore, the battery powers the drive assembly, allowing pets to play independently, reducing the need for user supervision.

In some embodiments, the drive structure further comprises a sensor for detecting the toy member and/or the pet. This enhances product intelligence, reduces the need for user supervision, and conserves power.

In some embodiments, if the sensor does not detect a pet playing nearby for a certain period, it triggers the system to turn off the motor drive. Once the sensor detects the pet approaching again, it reactivates the motor drive.

Other features and advantages of this application will be described in the following specification, or may be inferred from the specification, or become apparent through the implementation of the described techniques.

To make the objectives, features, and advantages of this application more comprehensible, the following sections provide detailed descriptions of preferred embodiments with reference to accompanying Figs.

BRIEF DESCRIPTION OF THE DRAWINGS

In order to more clearly explain the technical solutions of the embodiments of the present disclosure, the following drawings that need to be used in the embodiments of the present disclosure will be briefly introduced. It should be understood that the following drawings only illustrate certain embodiments of the present disclosure, and therefore should not be regarded as limiting the scope. For those skilled in the art, other related drawings can be obtained from these drawings without making creative labor.

DETAILED DESCRIPTION OF THE EMBODIMENTS

Figure 1:
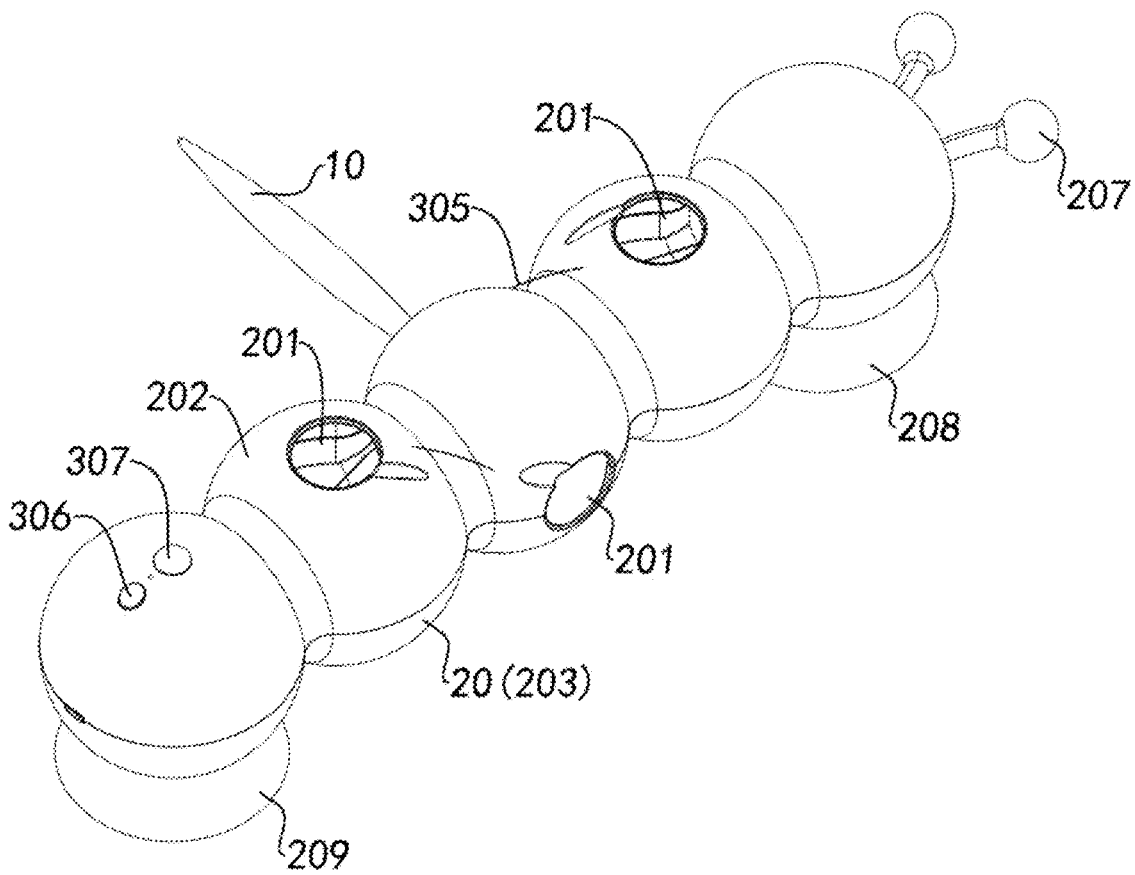
FIG. 1 is a schematic structural diagram of the pet toy provided in the embodiment of this application.

Hereinafter, the technical solutions in the embodiments of the present disclosure will be clearly and completely described with reference to the accompanying drawings in the embodiments of the present disclosure, and it is obvious that the described embodiments are only a portion of the embodiments of the present disclosure, but not all the embodiments. The components of the embodiments of the present disclosure generally described and illustrated in the drawings herein may be arranged and designed in a variety of different configurations. Accordingly, the following detailed description of embodiments of the disclosure provided in the accompanying drawings is not intended to limit the scope of the claimed disclosure, but is merely to represent selected embodiments of the disclosure. Based on the embodiments of the present disclosure, all other embodiments obtained by those skilled in the art without making creative work belong to the scope of protection of the present disclosure.

In the present disclosure, the orientation or positional relationship indicated by the terms "upper", "lower", "left", "right", "front", "back", "top", "bottom", "inner", "outer", "middle", "vertical", "horizontal", "longitudinal" and the like is based on the orientation or positional relationship shown in the drawings. These terms are primarily intended to better describe the disclosure and embodiments thereof and are not intended to limit that the indicated device, element, or member must have a specific orientation, or be constructed and operated in a specific orientation.

Moreover, some of the above terms may be used to mean other meanings in addition to orientation or positional relationships, for example, the term "on" may also be used to mean some kind of attachment or connection relationship in some cases. The specific meanings of these terms in the present disclosure can be understood by those of ordinary skill in the art according to the specific circumstances.

Furthermore, the terms "mounted", "provided", "connected", and "disposed" are to be understood broadly. For example, it may be a fixed connection, a detachable connection, or a monolithic construction; may be a mechanical connection or a point connection. It may be directly connected, indirectly connected through an intermediate medium, or internal communication between two devices, elements, or members. Those skilled in the art can understand the specific meanings of the above-mentioned terms in the present disclosure according to the specific circumstances.

Furthermore, the terms "first", "second", and the like are primarily used to distinguish between different devices, elements, or members (specific kinds and configurations may or may not be the same), and are not intended to indicate or imply the relative importance and the number of indicated devices, elements, or members. Unless otherwise specified, "a plurality of" means two or more.
Embodiments There are more and more varieties of pet toys on the market now, but some designs are either too simple to genuinely attract pets' interest or overly complex, making them expensive and deviating from pets' natural instincts and users' aesthetics.

The inventors discovered that one of the key considerations in the design process of pet toys is ensuring the safety of pets during play and exercise. If the pet's safety cannot be guaranteed, it could lead to disastrous consequences. Additionally, after ensuring basic safety measures, it is also very important to ensure the longtime-working functionality of the pet toy. This is especially crucial when pet owners cannot accompany their pets around the clock, making the design for longtime-working functionality of the pet toy necessary.

In view of this, as shown in FIGS. 1 to 5, this application embodiment provides a pet toy, which comprises: a toy member 10; a toy housing 20 configured with multiple openings 201, which are distributed at different positions along a preset direction; and a drive structure 30, which comprises a first drive assembly, a second drive assembly, and a connecting member 305. The connecting member 305 is connected with the toy member 10, wherein one end of the connecting member 305 is connected to the first drive assembly and the other end is connected the second drive assembly, for allowing the toy member 10 to successively move through adjacent and/or spaced openings 201 when driven by the first drive assembly and/or second drive assembly.

Exemplarily, the toy member 10 may comprise, but is not limited to, flexible materials such as rubber or plastic, etc. The toy member 10 can take the form of small long-tailed teaser objects, bird models, etc., as long as it can move through multiple openings 201.

As for the toy housing 20, its shape is not specifically limited and can be designed according to practical requirements, such as a caterpillar or mouse shape. For instance, in a caterpillar-shaped design, at least one antennae 207 is provided on one end of the toy housing 20. The toy housing 20 may comprise an upper housing 202 and a lower housing 203, which are symmetrical and connected to form an enclosed chamber, wherein the chamber is communicated with the openings 201, for allowing the toy member 10 to enter the chamber from the outside of the toy housing 20 or move outward from the chamber when the first drive assembly and/or second drive assembly is operating.

The connecting member 305 of the drive structure 30 may comprise, but is not limited to, a rope. The first drive assembly and second drive assembly are respectively connected to the opposite ends of the connecting member 305, wherein the first drive assembly and second drive assembly can both rotate synchronously, or one of the first drive assembly and second drive assembly can act as the active drive while the other serves as the passive drive, enabling the toy member 10 to move back and forth between two ends of the toy housing 20.

In the above implementing process, the toy member 10 is connected to the connecting member 305. the first drive assembly and second drive assembly are respectively connected to the connecting member 305. The tension applied to the connecting member 305 by the first drive assembly and second drive assembly is not high, which can be quickly adjusted even when the connecting member 305 is in a relaxed state. Moreover, pets can pull or bite the toy member 10 during play without affecting its functionality, as it can quickly return to normal operation. This allows the first drive assembly and/or second drive assembly to move the toy member 10 through multiple openings 201, achieving an excellent pet-enticing effect.

Figure 2:
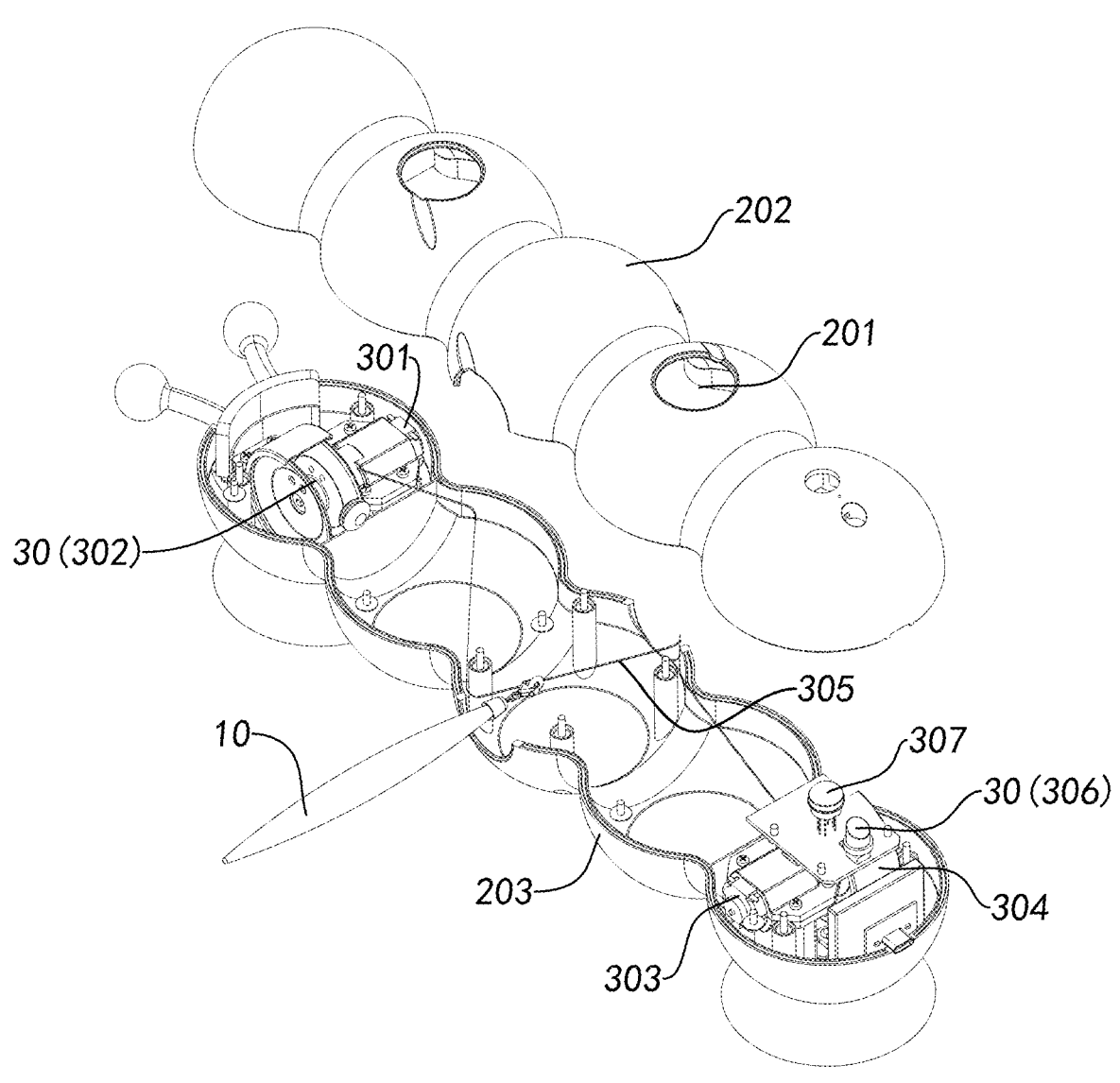
FIG. 2 is an exploded schematic diagram of the pet toy provided in the embodiment of this application.
Figure 3:
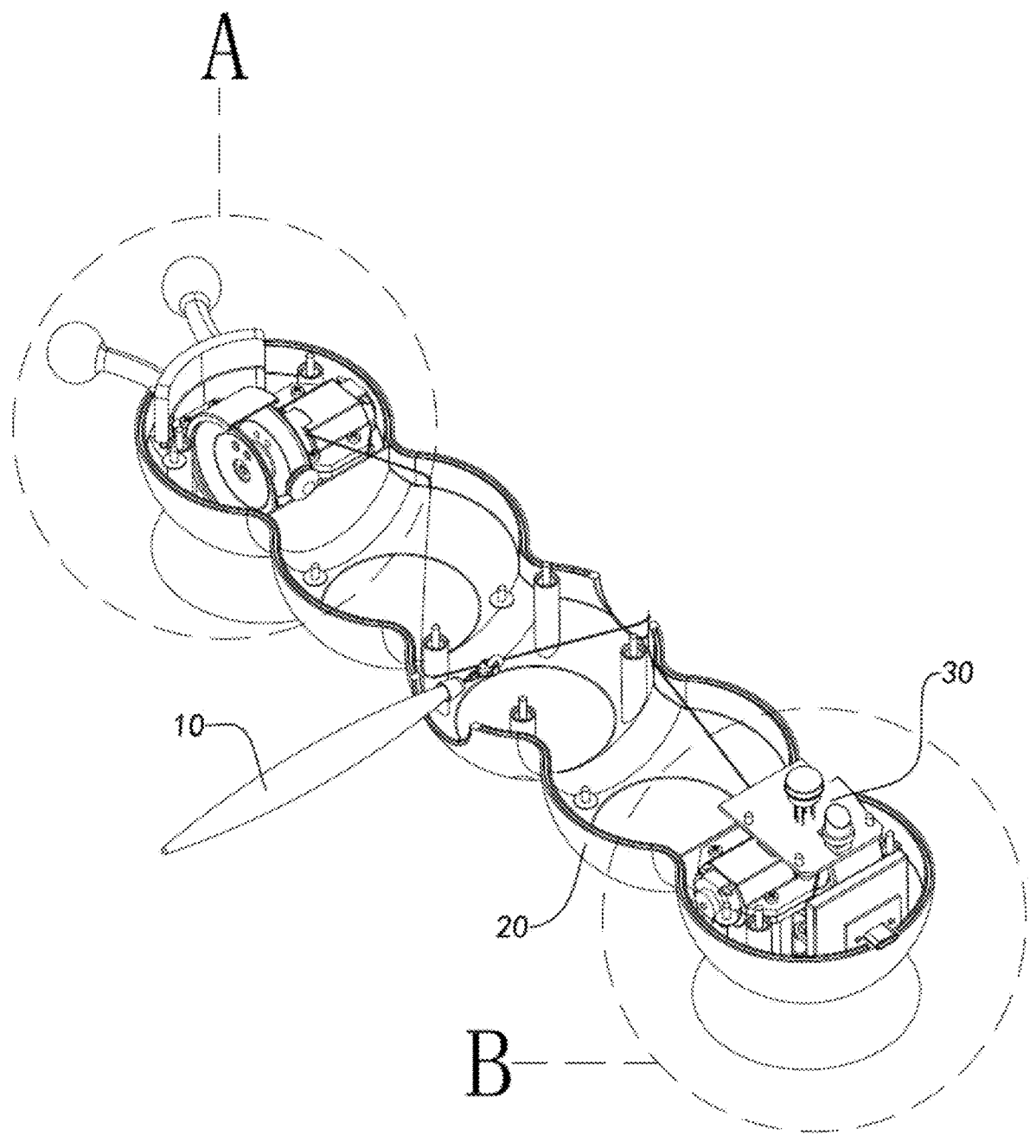
FIG. 3 is a partial structural schematic diagram of the pet toy provided in the embodiment of this application.
Figure 4:
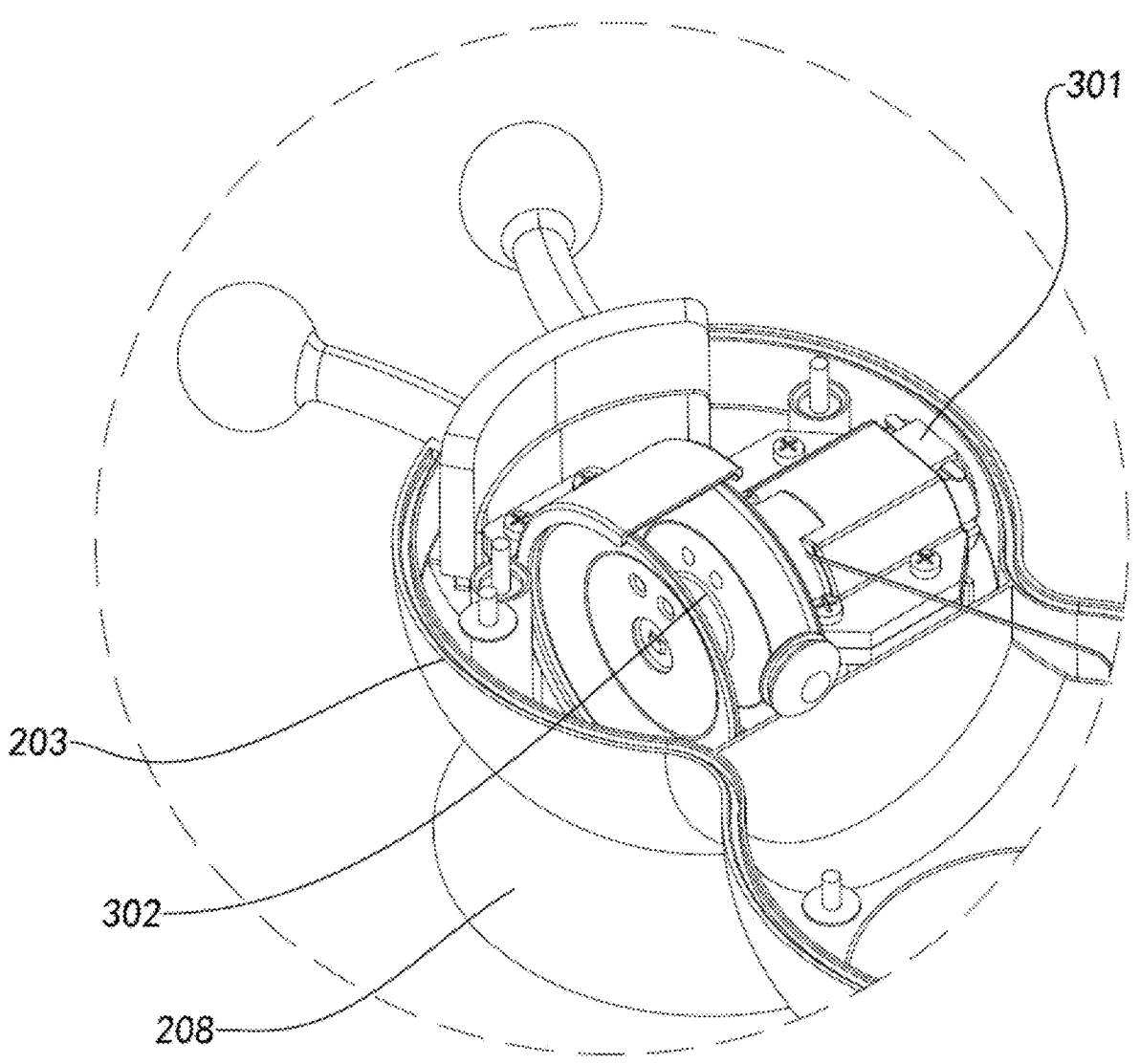
FIG. 4 is a partially enlarged schematic diagram of the part A of FIG. 3.
Figure 5:
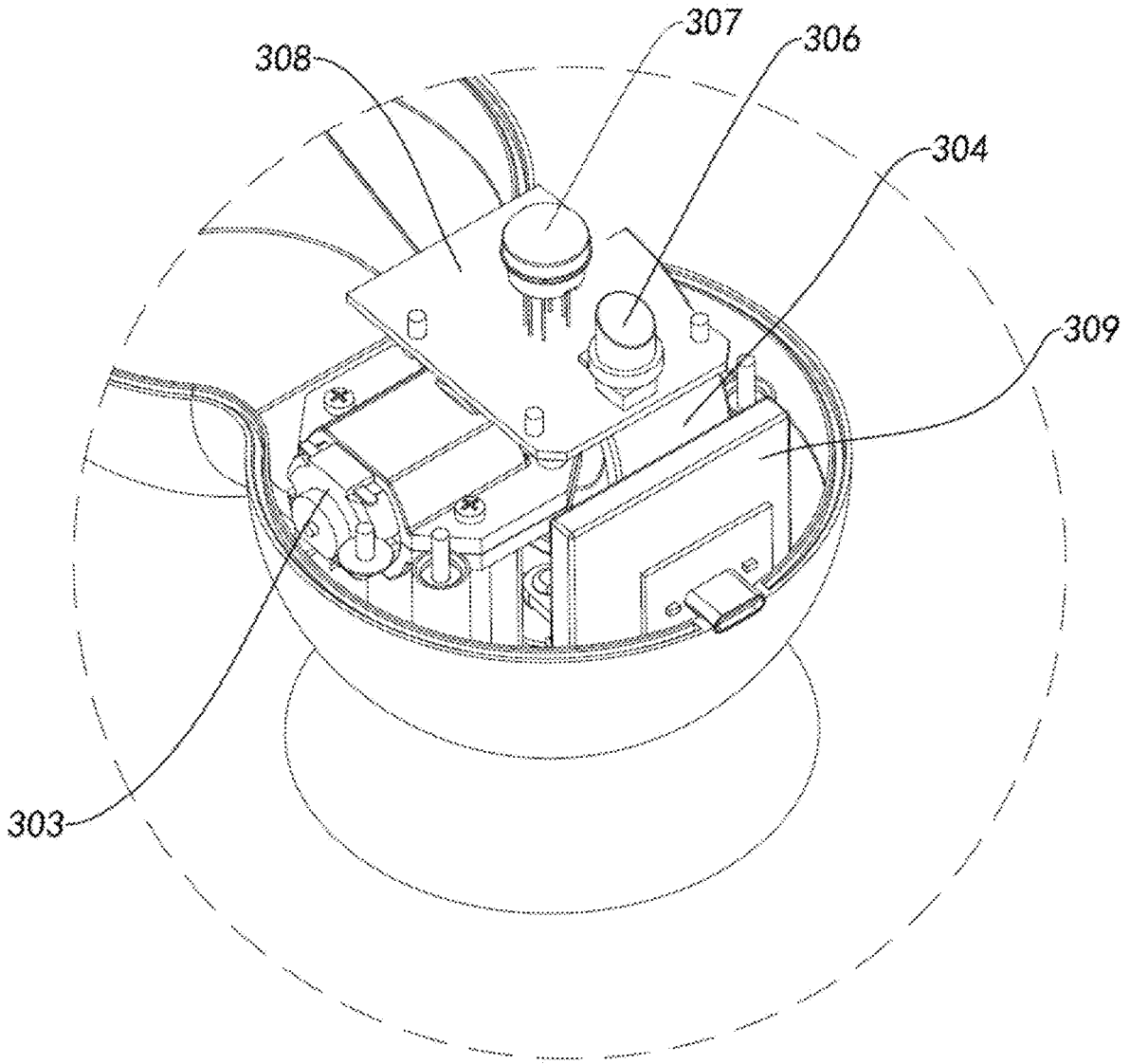
FIG. 5 is a partially enlarged schematic diagram of the part B of FIG. 3.

As shown in FIGS. 2 and 3, the first drive assembly comprises a first drive component 301 and a first rotating wheel component 302. The first drive component 301 is connected to the first rotating wheel component 302, which is configured to wind or release the connecting member 305. The first rotating wheel component 302 is driven by a drive end of the first drive component 301 or rotates relative to the drive end of the first drive component 301.

Exemplarily, the first drive component 301 comprises a first drive element and a first transmission element. The first transmission element is connected to a rotating shaft of the first drive element, wherein the first drive element may comprise, but is not limited to, a reduction motor. The first transmission element may comprise, but is not limited to, meshing gears. The first rotating wheel component 302 comprises a first turntable and a first rotating shaft, wherein the first turntable is connected to the first rotating shaft, and the first turntable has a wire storage section for winding the connecting member 305. The diameter of a turntable body of the first turntable (which may be circular but is not limited to this shape) is larger than the diameter of the wire storage section. Additionally, the edge of the turntable body is inclined and protruding outward to ensure the longtime-working and normal operation of the pet toy, and to prevent the wire from unwinding when it rotates quickly or changes direction during operation. If the wire unwinds, it could easily lead to tangled wiring, causing the toy to stop working or damaging the first driving element. The first rotating wheel shaft is connected to the first transmission element, allowing the first rotating wheel component 302 to rotate independently without being affected by the first driving element. This means the first driving element can be locked (i.e., the first driving element can rotate or remain stationary while still allowing the first rotating wheel component 302 to rotate), ensuring that even when the first driving element is in the forward driving process, if no external force is applied, the first driving element should drive the first rotating wheel component 302 to rotate forward together, completing the winding or unwinding process. However, if external force is applied (for example, if the pet grabs or bites the toy part 10 or the connecting member 305 and pulls it forcefully), the entire pet toy system will lose its normal operation. In this case, conventional pet toys usually either get damaged easily or cause injury to the pet, as the motor's driving force is typically large. When pulling a thin rope with force, the pet's claws or mouth are often easily scratched. By allowing the first driving element to be locked, and gradually restoring the normal operation after the pet puts down the toy, the pet is not harmed, and the toy's functionality is maintained.

In the above implementing process, the first drive component 301 is connected to the first rotating wheel component 302, wherein the first rotating wheel component 302 can either be directly driven by the first drive component 301 to move the toy member 10 or, when the toy member 10 experiences external force, the first rotating wheel component 302 can rotate independently relative to the first drive component 301 under the tension of the connecting member 305. This design can attract pets for play and exercise while preventing injuries. Furthermore, when the pet releases the toy, the pet toy can gradually return to normal operation without losing toy's functionality.

Please refer to FIGS. 2 and 3 again. The second drive assembly comprises a second drive component 303 and a second rotating wheel component 304. The second drive component 303 is connected to the second rotating wheel component 304, which is designed to wind or release the connecting member 305. The second rotating wheel component 304 is driven by a drive end of the second drive component 303 or rotates relative to the drive end of the second drive component 303.

Exemplarily, the structure of the second driving component 303 may be the same as the first driving component 301, and the structure of the second rotating wheel component 304 may be the same as the first rotating wheel component 302. The second driving component 303 comprises a second driving element and a second transmission element. The second transmission element is connected to the shaft of the second driving element. The second driving element comprises, but is not limited to, a reduction motor, and the second transmission element comprises, but is not limited to, a meshing gear. The second rotating wheel component comprises a second turntable and a second rotating wheel shaft. The second turntable is connected to the second rotating wheel shaft, and the second turntable has a wire storage section that winds around the connecting member 305. The diameter of a turntable's body of the second turntable (including, but not limited to, circular shapes) is larger than the diameter of the wire storage section. Additionally, the edge of the turntable body is inclined and protruding outward to ensure the longtime-working and normal operation of the pet toy, and to prevent the wire from unwinding when it rotates quickly or changes direction during operation. If the wire unwinds, it could easily lead to tangled wiring, causing the toy to stop working or damaging the second driving element. The second rotating wheel shaft is connected to the second transmission element, allowing the second rotating wheel component to rotate independently without being affected by the second driving element. This means the second driving element can be locked (i.e., the second driving element can rotate or remain stationary while still allowing the second rotating wheel component to rotate), ensuring that even when the second driving element is in the forward driving process, if no external force is applied, the second driving element should drive the second rotating wheel component to rotate forward together and complete the winding or unwinding process. However, if external force is applied (for example, if the pet grabs or bites the toy part 10 or the connecting member 305 and pulls it forcefully), the entire toy system will lose its normal operation. In this case, conventional pet toys usually either get damaged easily or cause injury to the pet, as the motor's driving force is typically large. When pulling a thin rope with force, the pet's claws or mouth are often easily scratched. By allowing the second driving element to be locked, and gradually restoring the normal operation after the pet puts down the toy, the pet is not harmed, and the toy's functionality is maintained.

In the above implementing process, the second drive component 303 is connected to the second rotating wheel component 304, wherein the second rotating wheel component 304 can either be directly driven by the second drive component 303 to move the toy member 10 or, when the toy member 10 experiences external force, it can rotate independently relative to the second drive component 303 under the tension of the connecting member 305. This design can attract pets for play and exercise while preventing injuries. Furthermore, when the pet releases the toy, the pet toy can gradually return to normal operation without losing functionality.

In some embodiments, the first drive assembly and second drive assembly each comprise a retraction state and a release state. When the first drive assembly is in the retraction state and the second drive assembly is in the release state, and after the first drive assembly completes the retraction of the connecting member 305, the first drive assembly reverses for a preset time, and then the first drive assembly switches to the release state while the second drive assembly switches to the retraction state. When the first drive assembly is in the release state and the second drive assembly is in the retraction state, and after the second drive assembly completes the retraction of the connecting member 305, the second drive assembly reverses for a preset time, and then the second drive assembly switches to the release state while the first drive assembly switches to the retraction state.

Exemplarily, when the first drive assembly is in the retraction state and the second drive assembly is in the release state, the first drive assembly can act as the active drive, while the second drive assembly can act as the passive drive (i.e., the second drive assembly is driven by the first drive assembly via the connecting member 305). Similarly, when the first drive assembly is in the release state and the second drive assembly is in the retraction state, the first drive assembly can act as the passive drive, while the second drive assembly can act as the active drive.

It should be noted that the pet toy is configured with a first drive assembly reduction motor and a second drive assembly reduction motor, allowing for more flexible movement of the toy member 10. Exemplarily, by adjusting the rotational speed and timing of the first drive assembly and second drive assembly, the movement distance of the toy member 10 can be controlled, creating a play effect where the toy member 10 appears momentarily at different openings 201. Moreover, the dual reduction motors which comprise the first drive assembly reduction motor and the second drive assembly do not require high tension on the rope; even if the rope is loose, it can be quickly adjusted. This also allows pets to pull or bite the toy member 10 during play without losing functionality, as it can quickly return to normal operation.

In the above implementing process, both the first drive assembly and second drive assembly can switch between a retraction state and a release state. When the first drive assembly and second drive assembly is operating, the toy member 10 moves between the first drive assembly and second drive assembly, effectively preventing the connecting member 305 from tangling due to pulling. This ensures the durability of the pet toy, prevents injuries to pets, and enhances safety.

In some embodiments, one of the first drive assembly or second drive assembly serves as the active drive, while the other acts as the passive drive.

Exemplarily, when the user turns on the power switch of the pet toy, it is assumed that the connecting member 305 is already wound around the reduction motor. The first drive assembly starts a driving operation in the collection direction. At this time, the second drive assembly rotates passively (the second drive assembly rotates passively under the active drive of the first drive assembly). The driving duration of the first drive assembly is the first working duration, such as approximately 1.5 seconds. After this, the connecting member 305 can be fully or partially wound onto the first drive assembly, and the toy member 10 undergoes the process of passing through the opening 201 under the driving of the first drive assembly. Subsequently, the second drive assembly starts reverse rotation for the first working duration. At this point, the first drive assembly rotates passively, and under the active drive of the second drive assembly, the connecting member 305 gradually increases the amount of winding on the second drive assembly. The toy member 10 begins a reverse passing process. As long as the sensor 307 of the drive structure 30 detects a pet engaged in the play training, the process will loop, and the toy member 10 will repeatedly pass through the opening 201. After each winding, a pause time can be set, for example, 2 seconds. The pause time can be fixed or variable, with the varying time providing a more diverse and flexible cat-enticing effect for the toy.

Of course, in other embodiments, there may be different methods from the one described above. The difference lies only in the driving methods, such as both the first and second drive assembly and the second drive assembly driving simultaneously. This can effectively reduce the rope jamming caused by passive rotation, though at the cost of consuming more electrical energy.

In the above implementing process, once a driving cycle is completed, the rope is wound onto one of the rotating wheels while the other wheel remains nearly empty. This ensures that when during the next drive cycle, the other wheel has little to no rope wound on it, preventing friction on both wheels simultaneously. With the rope wound only on one wheel, friction is effectively reduced, making it easier to drive and less likely to jam, which would lead to drive failure. This improves the product's durability and playability.

In some embodiments, when the connecting member 305 is completely retracted by either the first drive assembly or second drive assembly and the connecting member 305 is in a tense state, reverse movement may fail due to insufficient motor torque (e.g., when battery power is low and the motor cannot overcome the friction caused by the tightly wound connecting member). In this case, after each retraction operation is completed or before it starts, the drive motor can be controlled to perform a brief reverse drive to achieve a shaking effect. After rotating in the loose direction of the connecting member 305 for a preset short time, at least one of the first or second drive assemblies performs the reverse retraction drive. The preset short time (for example, 100 milliseconds) ensures that the connecting member which is in a tense state becomes loose due to the brief reverse rotation (shaking), which effectively reduces the friction caused by the connecting member winding in the tense state. This makes it easier for the next reverse drive to function and reduces the reverse drive failure. This approach ensures that even when the power is low, the drive operation can still be completed, effectively extending the operating time and solving the jamming issue.

It is understood that this method differs from the previous two methods by adding an active loosening/shaking motion.

Specifically, after the user turns on the power, it is assumed that the connecting member 305 is already wound around the reduction motor. The first drive assembly and second drive assembly simultaneously rotate in the loosening direction for a short duration (e.g., 100 milliseconds) before pausing. At this stage, the toy member 10 remains nearly stationary. This step ensures that the connecting member 305 is in a relatively relaxed state after the previous winding cycle, preventing excessive tightness that could cause future drive failures. After this, the first drive assembly stops, while the second drive assembly continues rotating in the same (loosening) direction, moving the toy member 10 through the opening 201. The second drive assembly runs for a preset long time (e.g., approximately 1.5 seconds) before stopping, and then the second drive assembly stops and the first drive assembly starts reversing for the same long duration, completing the back-and-forth movement of the toy member 10.

The duration of the preset long time is related to the length of the connecting member 305 and the motor drive diameter. By the end of this rotation, the toy member 10 should have passed through all or some of the openings 201 and reached a different position from its initial starting point. For example, at the end of the preset long time rotation, the connecting member 305 may be fully wound onto the second drive assembly. The entire loosening process can proactively alleviate jamming, and since only a brief activation is used, it effectively addresses the jamming issue while also saving power. The loosening action can be configured to occur before a certain motor is driven, after it is driven, or it can involve multiple loosening/shaking operations with varying durations.

In some embodiments, the length of the connecting member 305 is 1.5 to 3 times the length of the toy housing 20. For example, the connecting member 305 may be twice the length of the toy housing 20. This prevents excessive friction buildup when the connecting member 305 is wound, avoiding jamming and ensuring that the torque of the first drive assembly or second drive assembly is sufficient to overcome friction, thereby preventing drive failure and ensuring the movement of the toy member 10. This enhances the product's durability and playability.

Please refer again to FIGS. 1-3. The toy housing 20 comprises a first housing component 204, second housing component 205, and a third housing component 206. The first housing component 204 is configured to accommodate the first drive assembly. Multiple second housing components 205 are positioned between the first housing component 204 and third housing component 206, each second housing component 205 are configured an opening 201. The third housing component 206 is configured to accommodate the second drive assembly.

Exemplarily, the first housing component 204, second housing component 205, and third housing component 206 may be integrally molded. The number of second housing component 205 is not limited but may be three, with the first housing component 204 on the left and the third housing component 206 on the right. The leftmost of the housing component 205 have a single opening 201 positioned at the top and the rightmost of the housing component 205 also have a single opening 201, wherein the single opening 201 locates on the upper side of the housing component 205, while the middle of the second housing component 205 has two openings 201 on its front and back sides.

It should be noted that when there are three second housing components 205, one end of the connecting member 305 is connected to the first drive assembly, and the end of the connecting member 305 first exits through the rightmost of the second housing component 205, then extends to the middle of the second housing component 205, sequentially passes through both of the two openings 201, then exits through the opening 201 of the leftmost of the second housing component 205 and extends into the chamber of the toy housing 20, and finally is connected to the second drive assembly, completing the connection of the connecting member 305.

To secure the first drive assembly and second drive assembly, the toy housing 20 also comprises a first upper cover, first lower cover, second upper cover, and second lower cover. The first upper and lower covers are positioned inside the first housing component 204 and are connected to secure the first drive assembly between them. The second upper and lower covers are positioned inside the third housing component 206 and connected each other to secure the second drive assembly.

In the above implementing process, the first drive assembly and second drive assembly are respectively provided inside the toy housing 20 for not only enhancing aesthetics but also protecting the components, increasing their lifespan. The second housing component 205 is provided in multiple units, wherein each one of the second housing component 205 are provided an opening 201. The connecting member 305 can pass through the openings 201 according to a predetermined distribution pattern. As a result, under the operation of the first drive assembly or the second drive assembly, the toy member 10 can move along a preset path, forming a hide-and-seek game to attract pets and increase their interest in playing.

In some embodiments, the toy housing 20 further comprises a first support component 208 and a second support component 209. The first support component 208 is connected to the first housing component 204, with the connection method including but not limited to integrated molding. The second support component 209 is connected to the third housing component 206, with the connection method including but not limited to integrated molding.

In the above implementing process, the first housing component 204 is provided with the first support component 208, while the third housing component 206 is provided with the second support component 209. Through the support provided by the first support component 208 and the second support component 209, the pet toy is stabilized, making it easier for users to secure the toy.

In some embodiments, the drive structure 30 further comprises a switch member 306, a control board 308, and a battery 309. The switch member 306 is connected to the control board 308, wherein the control board 308 is connected to the first drive assembly and second drive assembly. The battery 309 supplies power to both the first drive assembly and second drive assembly. The control board 308 manages the overall electrical control of the pet toy, while the switch member 306 is used for powering the toy or adjusting its operation modes.

In the above implementing process, the switch member 306 is connected to the control board 308, for allowing switch member 306 to control the operation of the first drive assembly and/or second drive assembly. Additionally, the tension requirement for the connecting member 305 is not high, allowing for quick adjustments even when the connecting member 305 is in a relaxed state. This design enables pets to pull or bite the toy member 10 during play without affecting its functionality, as it can quickly return to normal operation. Users do not need to disassemble or repair the product, making assembly more convenient. Meanwhile, the battery 309 provides power to the first drive assembly and second drive assembly, allowing pets to engage with the toy independently, reducing the amount of supervision required from users.

In some embodiments, the drive structure 30 also comprises a sensor 307, which is exposed on the toy housing 20 to detect the toy member 10 and/or the pet. The switch member 306, control board 308, battery 309, and sensor 307 can all be arranged within the first housing component 204 or the second housing component 205. This design enhances the toy's intelligence, reduces user supervision time, and conserves energy.

Exemplarily, the sensor 307 is used to detect whether a pet is nearby. If the pet has been absent for an extended period (e.g., 3-5 minutes), the control board 308 will temporarily turn off the reduction motor to save power. When the pet reappears, the sensor 307 will detect its presence and trigger the restart of the reduction motor, allowing the toy to resume operation.

In all embodiments of this application, terms such as "large" and "small" are relative, as are "more" and "less," as well as "upper" and "lower." The description of these relative terms will not be repeated in this application.

It should be understood that when terms such as "in this embodiment," "in this application embodiment," or "as an optional implementation" appear throughout this specification, they indicate that the specific features, structures, or characteristics described are comprised in at least one embodiment of this application. Therefore, occurrences of these phrases throughout the specification do not necessarily refer to the same embodiment. Furthermore, the described features, structures, or characteristics can be combined in any suitable manner across one or multiple embodiments. It should also be noted by those skilled in the field that all described embodiments in this specification are optional, and the associated actions and modules are not necessarily required for this application.

In various embodiments of this application, the numerical order of the described processes does not necessarily indicate a strict sequence of execution. Instead, the execution order should be determined based on their function and intrinsic logic, and should not be considered a limitation on the implementation process of this application.

The above is merely a specific embodiment of the present disclosure, but the scope of protection of the present disclosure is not limited thereto, and any person skilled in the art can easily think of changes or substitutions within the technical scope disclosed in the present disclosure, and should be covered within the scope of protection of the present disclosure. Therefore, the scope of protection of the present disclosure should be the same as that of the claims.

What is claimed is:

1. A pet toy for driving a toy member to play with or training a pet, comprising:

a toy housing configured with multiple openings distributed at different positions;

a first drive assembly which comprises a first drive component and a first rotating wheel component which is configured to be driven to rotate by said first drive component or is allowed to rotate relative to said first drive component;

a second drive assembly which comprises a second drive component and a second rotating wheel component which is configured to be driven to rotate by said second drive component or is allowed to rotate relative to said second drive component; and a connecting member which is a rope connected between said first rotating wheel component and said second rotating wheel component, wherein the toy member is connected to the connecting member, so as to be configured to be driven by at least one of said first drive assembly and said second drive assembly to sequentially pass through said multiple openings;

wherein each of said first drive assembly and said second drive assembly has a retraction state for winding said connecting member and a release state for releasing said connecting member, wherein after a retraction of said connecting member on one of said first rotating wheel component and said second rotating wheel component, at least one of said first rotating wheel component and said second rotating wheel component is configured to be controlled to rotate in a loose direction for a preset time before proceeding to a next cycle of retraction and loosening of said connecting member.

2. The pet toy according to claim 1, wherein said first rotating wheel component is coupled to said first drive component by a rotating shaft-mesh gear engaging manner, and said second rotating wheel component is coupled to said second drive component by a rotating shaft-mesh gear engaging manner.

3. The pet toy according to claim 1, further comprising a control board which is connected to said first drive assembly and said second drive assembly, a switch member which is connected to said control board, and a battery which is connected to said first drive assembly and said second drive assembly.

4. The pet toy according to claim 1, further comprising a sensor for detecting the pet.

5. The pet toy according to claim 1, wherein when said sensor does not detect the pet playing nearby for a period of time, said sensor provides feedback for shutting down said first drive assembly and said second drive assembly, and upon detecting the pet approaching again, said sensor provides feedback for restarting said first drive assembly and said second drive assembly.

6. A pet toy for driving a toy member to play with or training a pet, comprising:

a toy housing configured with multiple openings distributed at different positions;

a first drive assembly which comprises a first drive component and a first rotating wheel component which is configured to be driven to rotate by said first drive component or is allowed to rotate relative to said first drive component;

a second drive assembly which comprises a second drive component and a second rotating wheel component which is configured to be driven to rotate by said second drive component or is allowed to rotate relative to said second drive component; and a connecting member which is a rope connected between said first rotating wheel component and said second rotating wheel component, wherein the toy member is connected to the connecting member, so as to be configured to be driven by at least one of said first drive assembly and said second drive assembly to sequentially pass through said multiple openings;

wherein each of said first drive assembly and said second drive assembly has a retraction state for winding said connecting member and a release state for releasing said connecting member, wherein when said first drive assembly is in said retraction state and said second drive assembly is in said release state, and after said first rotating wheel component is configured to be driven to rotate to complete a retraction of said connecting member for winding said connecting member on said first rotating wheel component, said first rotating wheel component is configured to be driven to reversely rotate for a preset time to loosen said connecting member, and then said first rotating wheel component is configured to be switched to said release state to stop rotating, said second rotating wheel component is configured to be switched from said release state to said retraction state and is configured to be driven to rotate for winding said connecting member on said second rotating wheel component; wherein when said second drive assembly is in said retraction state and said first drive assembly is in said release state, and after said second rotating wheel component is configured to be driven to rotate to complete a retraction of said connecting member for winding said connecting member on said second rotating wheel component, said second rotating wheel component is configured to be driven to reversely rotate for a preset time to loosen said connecting member, and then said second rotating wheel component is configured to be switched to said release state to stop rotating, said first rotating wheel component is configured to be switched from said release state to said retraction state and is configured to be driven to rotate for winding said connecting member on said first rotating wheel component.

7. The pet toy according to claim 6, wherein said first rotating wheel component is coupled to said first drive component by a rotating shaft-mesh gear engaging manner, and said second rotating wheel component is coupled to said second drive component by a rotating shaft-mesh gear engaging manner.

8. The pet toy according to claim 6, further comprising a control board which is connected to said first drive assembly and said second drive assembly, a switch member which is connected to said control board, and a battery which is connected to said first drive assembly and said second drive assembly.

9. The pet toy according to claim 6, further comprising a sensor for detecting the pet.

10. The pet toy according to claim 6, wherein when said sensor does not detect the pet playing nearby for a period of time, said sensor provides feedback for shutting down said first drive assembly and said second drive assembly, and upon detecting the pet approaching again, said sensor provides feedback for restarting said first drive assembly and said second drive assembly.

11. A pet toy for driving a toy member to play with or training a pet, comprising:

a toy housing configured with multiple openings distributed at different positions;

a first drive assembly which comprises a first drive component and a first rotating wheel component which is configured to be driven to rotate by said first drive component or is allowed to rotate relative to said first drive component;

a second drive assembly which comprises a second drive component and a second rotating wheel component which is configured to be driven to rotate by said second drive component or is allowed to rotate relative to said second drive component; and a connecting member which is a rope connected between said first rotating wheel component and said second rotating wheel component, wherein the toy member is connected to the connecting member, so as to be configured to be driven by at least one of said first drive assembly and said second drive assembly to sequentially pass through said multiple openings;

wherein each of said first drive assembly and said second drive assembly has a retraction state for winding said connecting member and a release state for releasing said connecting member, wherein when said first drive assembly and said second drive assembly are powered on, said first rotating wheel component and said second rotating wheel component are configured to be driven to rotate in a loosening direction for a duration in which the toy member is stationary, and then said first rotating wheel component stops rotating and said second rotating wheel component is configured to be driven to rotate for winding said connecting member on said second rotating wheel component.

12. The pet toy according to claim 11, wherein said first rotating wheel component is coupled to said first drive component by a rotating shaft-mesh gear engaging manner, and said second rotating wheel component is coupled to said second drive component by a rotating shaft-mesh gear engaging manner.

13. The pet toy according to claim 11, further comprising a control board which is connected to said first drive assembly and said second drive assembly, a switch member which is connected to said control board, and a battery which is connected to said first drive assembly and said second drive assembly.

14. The pet toy according to claim 11, further comprising a sensor for detecting the pet.

15. The pet toy according to claim 11, wherein when said sensor does not detect the pet playing nearby for a period of time, said sensor provides feedback for shutting down said first drive assembly and said second drive assembly, and upon detecting the pet approaching again, said sensor provides feedback for restarting said first drive assembly and said second drive assembly.

* * * * *